United States Patent [19]
Kehl et al.

[11] 4,407,542
[45] Oct. 4, 1983

[54] WALK-OVER SEAT WITH LATCH

[75] Inventors: Norman J. Kehl, Elk Grove Village; Richard D. Unser, Wood Dale, both of Ill.

[73] Assignee: Coach and Car Equipment Corporation, Elk Grove Village, Ill.

[21] Appl. No.: 261,772

[22] Filed: May 8, 1981

[51] Int. Cl.³ .............................................. B60N 1/02
[52] U.S. Cl. .................................... 297/103; 180/331; 297/94; 297/104
[58] Field of Search .................. 297/94, 95, 100, 63, 297/67, 101, 103, 104; 296/65 R, 69; 180/331; 105/322, 336, 345; 74/526, 529, 527; 292/336, 267, DIG. 30; 5/43, 45, 59 R

[56] References Cited

U.S. PATENT DOCUMENTS

| | | | |
|---|---|---|---|
| 650,609 | 5/1900 | Otis | 74/529 X |
| 2,726,708 | 12/1955 | Eickhorn et al. | 297/103 |
| 3,150,897 | 9/1964 | Higley | 297/103 |
| 3,265,435 | 8/1966 | Bilancia | 297/101 |
| 3,313,570 | 4/1967 | McVeigh | 297/103 |
| 3,471,195 | 10/1969 | Rowe | 297/101 |
| 3,479,082 | 11/1969 | Bilancia | 297/103 |
| 3,800,337 | 4/1974 | Mizelle | 5/45 X |
| 3,986,218 | 10/1976 | Mizelle | 5/45 X |
| 4,081,051 | 3/1978 | Logsdon | 180/331 |
| 4,322,052 | 3/1982 | Hodge et al. | 297/94 |

*Primary Examiner*—James T. McCall
*Attorney, Agent, or Firm*—Merriam, Marshall & Bicknell

[57] ABSTRACT

A walk-over seat has a base with a pair of side members and a seat back which may be moved between the front and rear ends of the seat. The seat back is connected to the upper ends of two elongated links on each side of the seat back. Each link has a lower end mounted for pivotal movement about a horizontal axis between frontwardly and rearwardly extending positions. Each link is engaged by a respective latching member when the link is in one of its positions. Structure is provided to transfer to the side members of the seat the load exerted against a latching member by the link when the seat back is impacted or hit from behind, to prevent the latching member from being sprung or bent out of position. The latching member has a special configuration to accommodate differing dispositions and mountings of the latching member and the link it engages.

16 Claims, 7 Drawing Figures

WALK-OVER SEAT WITH LATCH

BACKGROUND OF THE INVENTION

The present invention relates generally to seats for mass transit vehicles such as railroad commuter cars and more particularly to walk-over seats for such vehicles.

A walk-over seat is one in which the seat back may be moved from the front end to the rear end of the seat to allow the seat passenger to face whichever direction he desires. Typically, a walk-over seat comprises a base having a pair of spaced-apart side members with a pair of parallel horizontal rods extending between the side members. At each side of the seat back are frontward and rearward elongated link members each having upper and lower ends. The upper end of each link member is connected to the seat back, typically near the bottom of the seat back. The lower end of each link member is pivotally mounted to a respective horizontal rod extending between the side members. This enables pivotal movement of a link member about the axis of its mounting rod and along a path extending between a first position, in which the link member extends angularly upwardly from the rod towards the front end of the seat, and a second position in which the link member extends angularly upwardly towards the rear end of the seat.

A problem arises on a walk-over seat when the seat back is impacted or hit from behind, causing the seat back to pivot forwardly about its pivotal axis, into the back of the occupants of that seat. Various latching structures have been devised in an attempt to prevent the seat back from pivoting forwardly when so impacted. However, various problems arise with these latching structures. Some of these problems are connected with the need to provide a fast and simple unlocking procedure to facilitate changing the position of the seat back when desired. Another problem is that the latch may be sprung or bent from its locking position when the latch is subjected to a large force as a result of an impact on the seat back.

SUMMARY OF THE INVENTION

A walk-over seat in accordance with the present invention comprises frontward and rearward latch members mounted alongside each other on each side member of the walk-over seat. Each latch member is mounted for pivotal movement about a vertical axis between a locking position, in which the latch member extends outwardly from the side member in the path of pivotal movement of the two adjacent link members, and a retracted position in which the latch member does not extend into that path. Each latch member is normally urged toward its locking position.

When either link member moves from its first to its second position it engages a first or rearward latch member and automatically pivots that latch member from its locking to its retracted position. Structure is provided for thereafter preventing retraction of the first latch member from its locking position upon being engaged by the frontward link member when the latter is subsequently urged from its second to its first position.

When either link member moves from its second to its first position it engages a second or frontward latch member and automatically pivots the second latch member from its locking to its retracted position. Structure is provided for thereafter preventing retraction of the second latch member from its locking position upon being engaged by the rearward link member when the latter is subsequently urged from its first to its second position.

Each of the two latch members holds the link member engaged thereby, and the seat back to which the link member is attached, in one of the two positions to which it may be pivoted. When it is desired to move the seat back and link member to another of their respective positions, the latch member is pushed to its retracted position and held there by a manually operated wiper member. This wiper member has lower and upper ends. The lower end mounts the wiper member for pivotal movement about the axis of one of the rods extending between the side members of the walk-over seat. The wiper member is pivotable between a first position, in which the wiper member extends angularly upwardly from its pivotal axis toward the front end of the seat, and a second position in which the wiper member extends angularly upwardly towards the rear end of the seat. The wiper member includes structure for engaging the first or rearward latch member when the latter is in its locking position and for urging the first latch member to its retracted position in response to pivotal member of the wiper member from its first to its second position. The wiper member also includes structure for holding the first latch member in its retracted position when the wiper member is in its second position.

The wiper member also includes structure for engaging the second or frontward latch member when the latter is in its locking position and for urging the second latch member to its retracted position in response to pivotal movement of the wiper member from its second to its first position. Also included on the wiper member is structure for holding the second latch member in its retracted position when the wiper member is in its first position.

Structure is also provided for preventing each of the latch members from being sprung or bent out of its locking position when subjected to a large force exerted against that latch member by the link member engaged thereby. More particularly, mounted on the adjacent side member is a stop element which is engaged by structure on the latch member, and that structure cooperates with the stop element to transfer to the adjacent side member the load exerted against the latch member by an engaged link member when the latter is forced against the latch member.

Other features and advantages are inherent in the structure claimed and disclosed or will become apparent to those skilled in the art from the following detailed description in conjunction with the accompanying diagrammatic drawings.

DETAILED DESCRIPTION

Figures 1, 7:
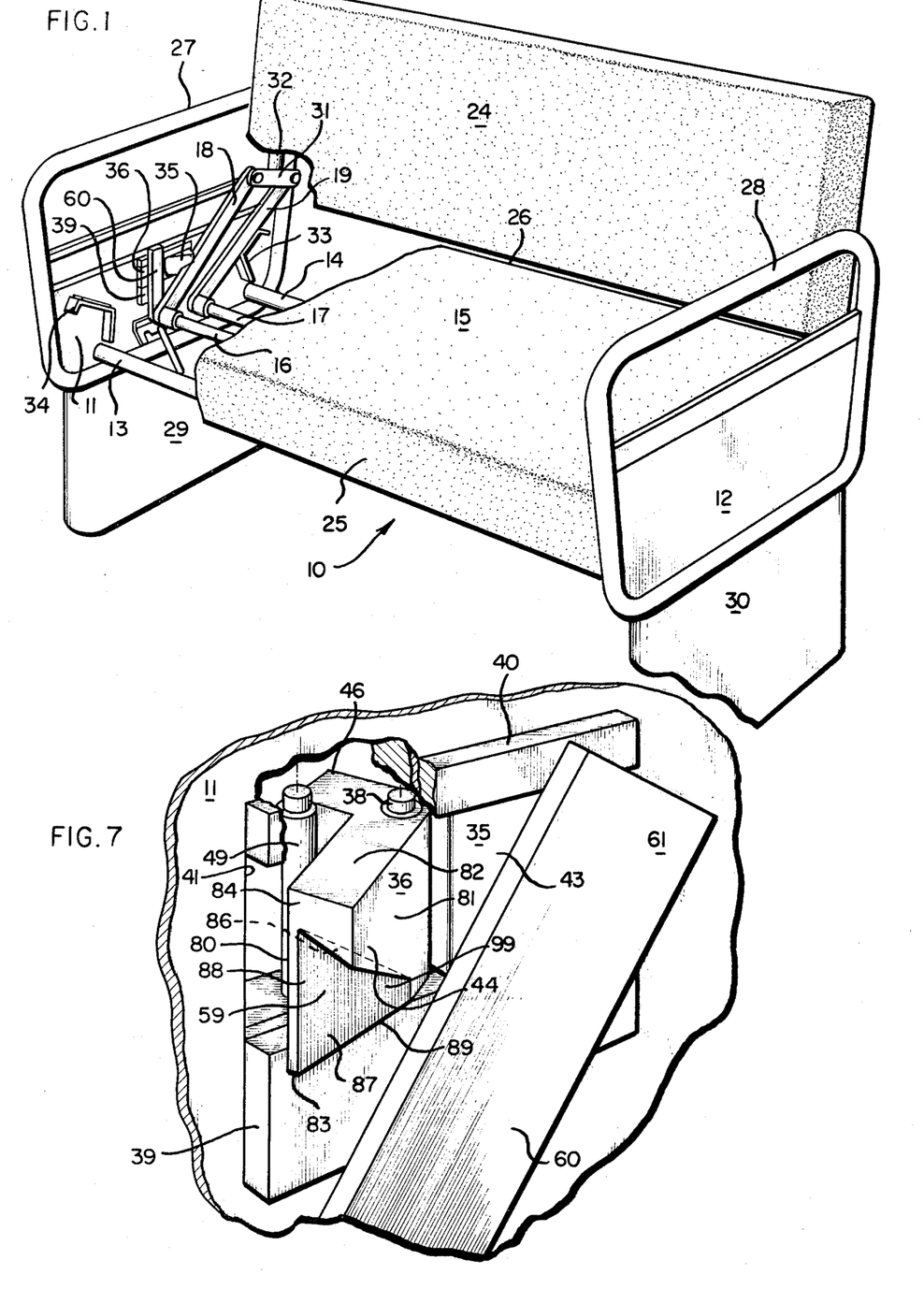
FIG. 1 is a perspective, partially cut away, of a walk-over seat constructed in accordance with an embodiment of the present invention.
FIG. 7 is an enlarged fragmentary perspective of a portion of the structure in the walk-over seat of FIG. 1.
Figure 3:
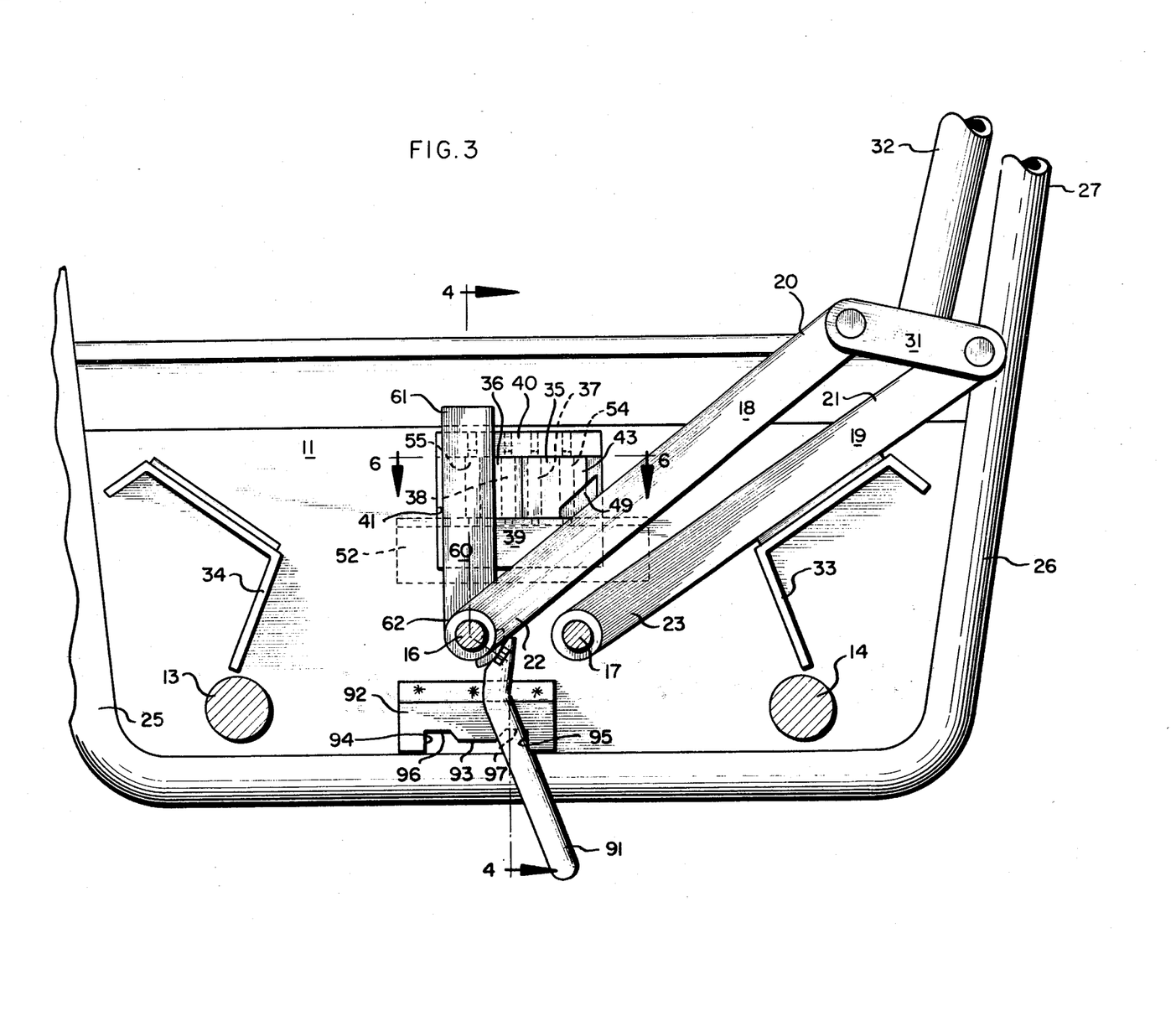
FIG. 3 is a vertical sectional view of a portion of the walk-over seat of FIG. 1.

Referring initially to FIGS. 1 and 3, indicated generally at 10 is a walk-over seat comprising a base including a pair of pedestals 29, 30 upwardly from each of which extends a respective side member 11, 12. Extending between side members 11, 12 are a horizontally disposed front cross member 13 and a horizontally disposed rear cross member 14, upon which rests a seat cushion 15. Also extending between side members 11, 12 are first and second horizontal rods 16, 17.

Attached to first horizontal rod 16 is the lower end 22 of a first elongated link 18 having an upper end 20 attached to a seat back 24 with connecting structure described below. Attached to second horizontal rod 17 is the lower end 23 of a second elongated link 19 having an upper end 21 also attached to seat back 24. Pivotally connected to upper link ends 20,21 is a connecting element 31. Extending upwardly from connecting element 31 is a seat back frame element 32 upon which seat back 24 is mounted.

There are first and second links 18, 19 mounted alongside each side member 11, 12 and having their respective upper ends connected to the seat back 24. Each link 18, 19 has its lower end pivotally mounted on a respective horizontal rod 16, 17 to mount the link for pivotal movement about the axis of that rod and along a path extending between a first position, in which the link extends angularly upwardly from the rod towards the front end 25 of the seat, and a second position in which the link extends angularly upwardly toward the rear end 26 of the seat 10 (FIGS. 1 and 3).

Surrounding each side member 11, 12 of the seat base is a respective tubular member 27, 28, also defining opposed arm rests for seat 10. Side member 11, links 18, 19 and connecting element 31 form a parallelogram-type linkage for mounting seat back 24 on the base of seat 10. A similar parallelogram-type linkage is located alongside side member 12.

Attached to each side member (e.g., 11) is a rear stop element 33 for limiting rearward movement of the links and for supporting second link 19 when links 18, 19 are in their rearwardly extended positions (FIG. 3). Also attached to each side member is a front support element 34 for limiting frontward movement of the links and upon which first link 18 rests when the two links 18, 19 are in their frontwardly extending positions.

Mounted on each side member 11, 12 is latching structure, described in detail below, for holding the link members 18, 19 in either their rearwardly extended or frontwardly extended positions. The latching structure will be described in detail in connection with side member 11, but identical latching structure is also provided on side member 12.

Referring to FIGS. 3–7, side member 11 has an opening 41 for accommodating the latching structure. Located at the bottom of opening 41 is a lower support element 39 attached to side member 11, and located at the top of opening 41 is an upper support element 40, also attached to side member 11. Extending between lower and upper support elements 39, 40 are a pair of vertically disposed pivot pins 37, 38. Pivotally mounted on pivot pin 37 is a first or rearward latch member 35, and pivotally mounted on second pivot pin 38 is a second or frontward latch member 36. Latch members 35, 36 each comprise a respective pawl portion 43, 44 and a respective tail portion 45, 46.

Figure 5:
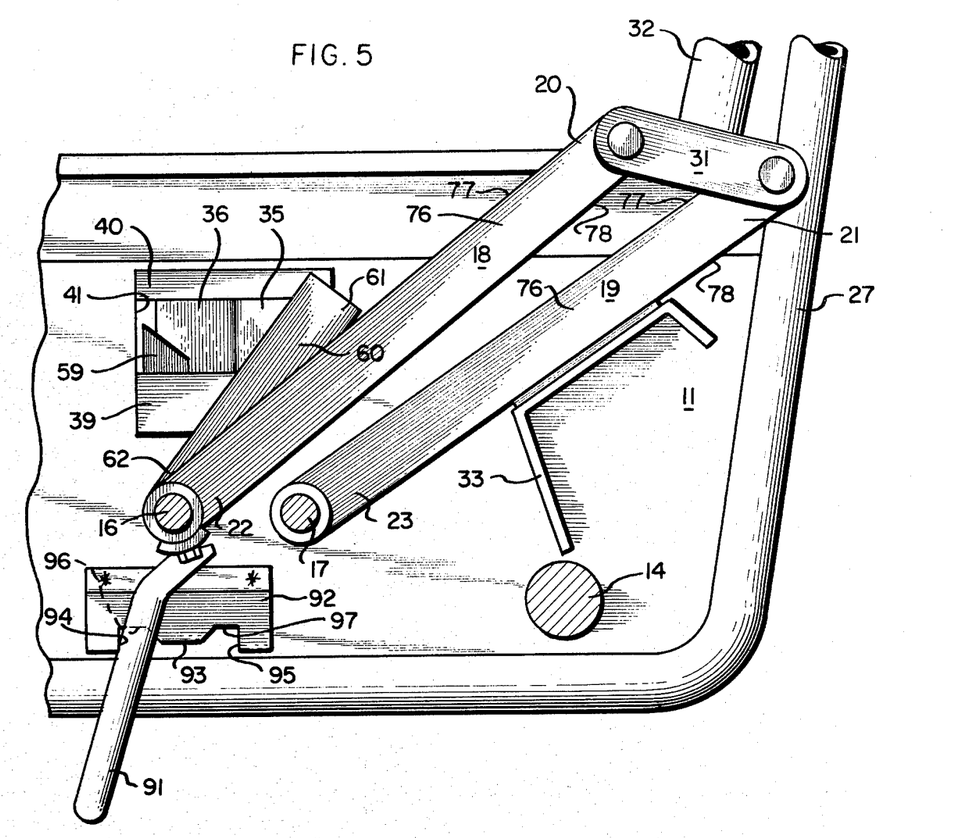
FIG. 5 is a fragmentary sectional view similar to FIG. 3.

First latch member 35 is mounted for pivotal movement about the vertical axis of pivot pin 37 between a locking position in which latch member 35 extends outwardly from side member 11 in the path of movement of links 18, 19 (FIGS. 3 and 6) and a retracted position in which latch member 35 does not extend into that path but, rather, is retracted into opening 41 in side member 11 (FIGS. 5 and 7).

Figure 6:
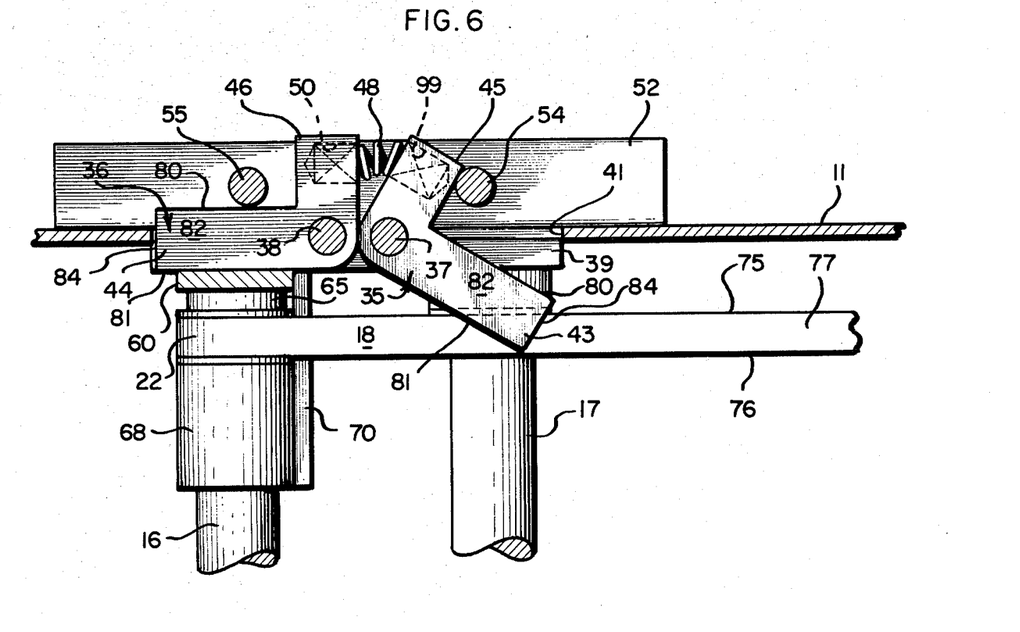
FIG. 6 is a horizontal sectional view taken along line 6—6 in FIG. 3.

Similarly, second latch member 36 is mounted for pivotal movement about the vertical axis of pivot pin 38 between a locking position in which second latch member 36 extends outwardly from side member 11 in the path of movement of links 18,19 (FIGS. 5 and 7), and a retracted position in which second latch member 36 does not extend into that path but, rather, is retracted into opening 41 (FIG. 6).

A coil spring 48 has opposite ends located within recesses 99, 50 in tail portions 45, 46 of latch members 35, 36. Coil spring 48 normally urges both latch members 35, 36 outwardly toward their respective locking positions.

When first and second links 18, 19 move toward their second or rearwardly extending positions (FIG. 5), pawl portion 43 on first latch member 35 is successively engaged by second link 19 and then first link 18 each of which pivots first latch member 35 from its locking position (FIG. 6) to its retracted position (FIG. 7). By the time link 18 has been pivoted to its second position, it has completely cleared first latch member 35 which is then urged outwardly by coil spring 48 back to its locking position where it remains.

When first latch member 35 is in its locking position it prevents pivotal movement by links 18, 19 from their rearwardly extending to their forwardly extending positions. More particularly, first latch member 35 comprises a cut-away portion 49 (FIG. 3) for receiving link 18 when the latter is in its second position and latch member 35 is in its locking position. The engagement of cut-away portion 49 with first link 18 locks link 18, as well as second link 19 and seat back 24, in their rearwardly extending positions illustrated in FIGS. 1, 3 and 5.

Figure 4:
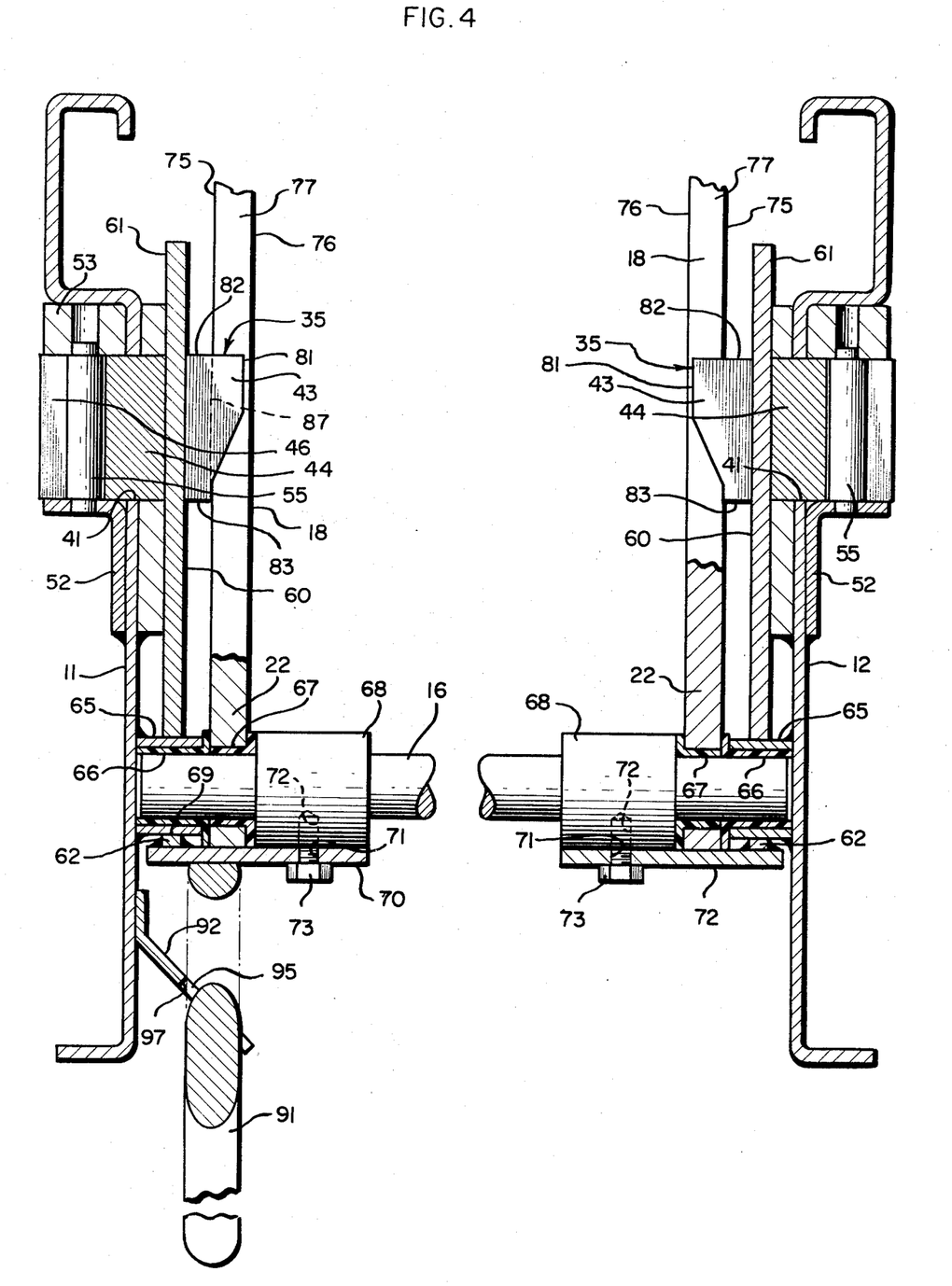
FIG. 4 is a sectional view taken along line 4—4 in FIG. 3.

Referring to FIGS. 3 and 4, attached to the outer surface of side member 11 at the bottom of opening 41 is a bracket 52, and attached to the outer surface of side member 11 near the top of opening 41 is an upper support element 53. Extending between bracket 52 and upper support element 53 are a pair of vertically disposed stop pins 54, 55, each for engaging a respective tail portion 45, 46 of a respective first and second latch member 35, 36.

Stop pin 54 engages tail portion 45 of first latch member 35 to limit outward pivotal movement of latch member 35 so that the latter does not pivot beyond its locking position (FIG. 6). Stop pin 54 also prevents movement of first latch member 35 further outwardly from its locking position upon being engaged by first link 18 when the latter is urged from its rearwardly extending second position to its frontwardly extending first position.

Stop pin 54 and the first latch member's pawl portion 43 and tail portion 45 constitute structure cooperating to transfer to side member 11 the load exerted against first latch member 35 upon being engaged by link 18 when the latter is urged from its rearwardly extending second position to its frontwardly extending first position. Stop pin 54 also constitutes structure for preventing first latch member 35 from being sprung or bent out of locking engagement with link 18 in response to the load exertion described in the preceding sentence.

Referring now to second latch member 36, when links 18, 19 pivot from their rearwardly extending second positions to their frontwardly extending first positions, each engages in succession against second latch member 36 and pivots the latter from its locking position (FIG. 7) to its retracted position in opening 41 of side member 11 (FIG. 6). After both links 18, 19 have been fully pivoted to their frontwardly extending first positions, second latch member 36 is returned, by the action of coil spring 48, to its locking position (FIG. 7) and remains there. Stop pin 55 (described above) performs the same functions in connection with second latch member 36 as did stop pin 54 in connection with first latch member 35.

Second latch member 36 comprises a cut-away portion 59 (FIG. 7), similar to the cut-away portion 49 on first latch member 35 (described above). Cut-away portion 59 on second latch member 36 performs the same functions with respect to second link 19 as did the first latch member's cut-away portion 49 with respect to first link 18.

When the links 18, 19 are in their rearwardly extending second positions, first latch member 35 is held in its locking position and cannot be pivoted therefrom to its retracted position absent some external force not available merely by the urging of links 18, 19 from their second to their first positions. Similarly, when links 18, 19 are in their frontwardly extending first positions, second link member 36 is maintained in its locking position and cannot be pivoted therefrom to its retracted position absent some external force not available merely by the urging of links 18, 19 from their first to their second positions.

Accordingly, structure is provided for moving first latch member 35 from its locking to its retracted position, and for holding it there, during movement of the links 18, 19 from their rearwardly extending second position to their frontwardly extending first position. This same structure may also be utilized to move second latch member 36 from its locking position to its retracted position and for holding it there during the movement of links 18, 19 from their frontwardly extending first position to their rearwardly extending second positions.

More particularly, mounted on first horizontal rod 16 is the lower end 62 of a wiper member 60 having an upper end 61. Wiper member 60 is mounted on horizontal rod 16 for pivotal movement about the axis of rod 16 independent of the pivotal movement of link 18 about that axis, all of which will be described subsequently in greater detail. As a result of its pivotal mounting, wiper member 60 is movable along a pivot path extending between a first position in which wiper member 60 extends upwardly from the axis of rod 16 (FIG. 3) and a second position in which the wiper member extends angularly upwardly and rearwardly relative to its first position (FIG. 5).

When wiper position 60 is pivoted from its first to its second position, the wiper member's upper end 61 engages first latch member 35, when the latter is in its locking position, and urges first latch member 35 to its retracted position (FIG. 7). Wiper member 60 maintains this engagement with first latch member 35 and holds the first latch member in its retracted position so long as wiper member 60 is in its second position (FIG. 7). When wiper member 60 and first latch member 35 are in the positions illustrated in FIG. 7, links 18 and 19 may be freely pivoted from their rearwardly extending second positions to their frontwardly extending first positions.

When first and second links 18, 19 are in their frontwardly extending first positions and second latch member 36 is in its locking position, the link members cannot be pivoted from their first to their second positions unless second latch member 36 is pivoted from its locking to its retracted position by some external force. Wiper member 60 serves this function. More particularly, when it is desired to move links 18, 19 from their frontwardly extending first positions to their rearwardly extending second positions, initially wiper 60 is pivoted from its rearwardly extending second position (FIG. 7) to its frontwardly extending first position (FIG. 3). When this occurs, the upper end 61 of the wiper member engages second latch member 36, when the latter is in its locking position, and urges second latch member 36 to its retracted position (FIG. 6). In addition the wiper member's upper end 61 maintains the engagement with second latch member 36 and holds the second latch member in its retracted position for as long as wiper member 60 is in its first position (FIG. 6).

Wiper members 60, 60 are operated by a handle 91 depending from rod 16. The handle may be kicked with a foot to actuate the wiper members. Thus each wiper member comprises manually operated structure for moving one of the two latch members 35, 36 to its retracted position and holding it there while permitting the other of the two latch members to occupy its locking position. Wiper number 60 operates alternately on each of the two latch members 35, 36.

Wiper handle 91 is offset vertically for purposes of symmetry and to accommodate other elements in the walk-over structure. Handle 91 cooperates wth a holding bracket 92 composed of springable material and extending angularly downwardly and outwardly from the inside surface of side member 11 (FIGS. 3 and 4). Bracket 92 has a lower cut-away portion 93 having opposed ends 94, 95 engageable with handle 91 and defining limits for the movement of handle 91. Each cut-away end 94, 95 is part of a respective notch 96, 97 within which handle 91 is held when wiper member 60 is in one of its two positions. Thus when wiper member 60 is in its first position (FIG. 3), handle 91 is in notch 97, and when the wiper member is in its second position (FIG. 5), the handle is in notch 96.

Because of the springable nature of bracket 92 and the manner in which the bracket depends from side member 11, handle 91 can be readily urged out of a notch 96 or 97 by kicking the handle. Absent such a kick, however, handle 91 is retained in one of the notches and wiper member 60 is retained in a corresponding one of its two positions.

To be described now in more detail is structure for mounting first links 18, 18 and wiper members 60, 60 on rod 16 for independent pivotal movement thereon of the wipers and the links 18.

Figure 2:
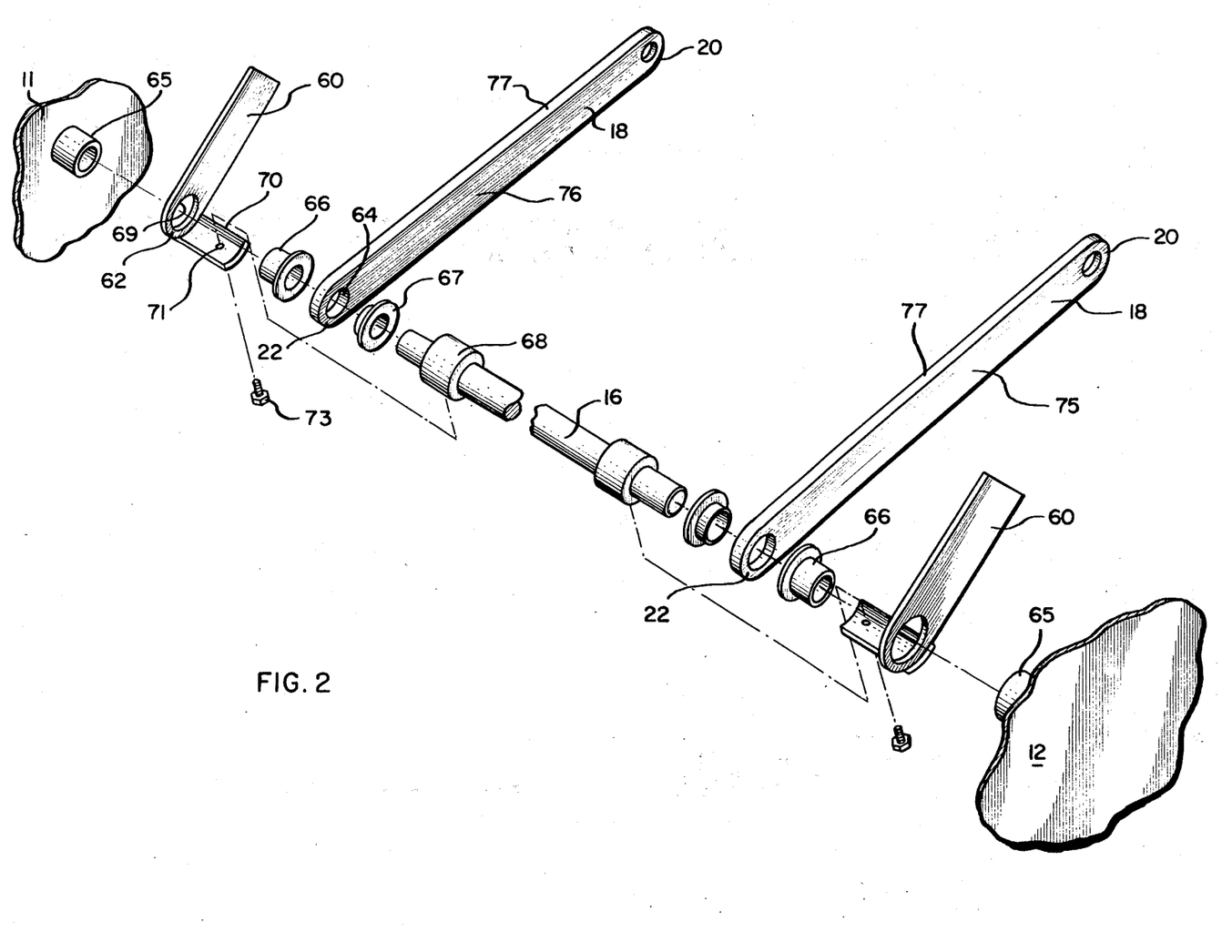
FIG. 2 is a fragmentary, exploded perspective illustrating some of the structure of the embodiment of FIG. 1.

Referring to FIGS. 2 and 4, attached to each side member 11, 12 is a bearing sleeve 65 which receives a bearing 66 which in turn receives a respective opposite end of rod 16, to mount the rod for pivotal movement about its axis. Mounted around the outside of rod 16 is a bearing 67 which fits through an opening 64 in the bottom end 22 of link 18 and mounts link 18 for pivotal movement about the axis of rod 16. Located in the lower end 62 of wiper member 60 is an opening 69 which movably mounts wiper member 60 around the outside of bearing sleeve 65. Extending inwardly from lower end 62 of wiper member 60 is a projection 70 having a screw opening 71 for receiving a screw 73 which is also threadedly received within a threaded opening 72 in a collar 68 fixed to rod 16 inwardly of the mounting of link 18 on rod 16. As a result, wiper member 60 is mounted for pivotal movement about the axis of rod 16 and moves only with rod 16 whereas link 18 is movable independently of rod 16 and wiper member 60, and vice versa.

There will now be described in more detail the features of latching members 35, 36 which facilitate the engagement with links 18, 19 when the latching members are in their locking positions.

With reference to FIGS. 2 and 4-5, each link 18 or 19 comprises an outer side surface 75, an inner side surface 76, a front surface 77 and a rear surface 78. The respective pawl portions 43, 44 of latch members 35, 36 each comprises a pair of side surfaces 80, 81, a top surface 82, a bottom surface 83 and an end surface 84 (FIGS. 3, 4 and 7). The pawl portion is cut away at bottom surface 83, at end surface 84 and at inner side surface 81 to provide the cut-away portions 49, 59 for the respective pawl portions 43, 44.

Each cut-away portion 49 or 59 comprises an upper ceiling 86 and an inner wall 87. Upper ceiling 86 is engaged by the front surface 77 of the adjacent link when the latch member is in its locking position and the link is urged from an adjacent position toward the other of its two positions (e.g., from the second toward the first position in the case of link 18 and latch member 35). Inner wall 87 abuts against the link's outer side surface 75 when the corresponding latch member is in its locking position and the adjacent link is in one of its terminal positions (e.g., the second position in the case of link 18 and latch member 35).

The cut-away portion 49 or 59 on each latch member has an open front 88 at end surface 84, an open bottom 89 at bottom surface 83 and a side opening 90 at inner side surface 81 of the pawl portion. The inside wall 87 of the cut-away portion extends angularly outwardly and rearwardly from end surface 84 to inner side surface 81 of the pawl portion. Upper ceiling 86 of the cut-away portion extends outwardly from inner side wall 87 to outside opening 90. Upper ceiling 86 also extends downwardly and rearwardly from open front 88 and has a triangular shape in the embodiment of FIG. 7.

Cut-away portions 49, 59 have a particular configuration intended to accommodate the differing dispositions and pivotal mountings of the links and the respective latching members engaged by the links. Thus, a given link (e.g., 18) is mounted for pivotal movement about a horizontal axis and extends angularly upwardly from its respective latching member (e.g., 35) while the latching member is mounted for pivotal movement about a vertical axis and, when it is in its locking position, it extends angularly outwardly toward its respective link. As a result, when the latching member is pivoted toward a retracted position from a locking position in which it has been engaging a link, the cut-away portion will serially overlap successively higher portions of the link's front surface 77, and the cut-away portion must be shaped to accommodate this.

The foregoing detailed description has been given for clearness of understanding only, and no unnecessary limitations should be understood therefrom as modifications will be obvious to those skilled in the art.

We claim:

1. A walk-over seat having front and rear ends and comprising:
    a base having a pair of side members;
    a horizontal rod extending between said side members;
    a seat back;
    a link having an upper end connected to said seat back and a lower end;
    means mounting said lower end on said rod for pivotal movement of said link about the axis of said rod and along a path extending between a first position, in which the link extends angularly upwardly from the rod towards said front end of the seat, and a second position in which the link extends angularly upwardly towards said rear end of the seat;
    a first latch member;
    means mounting said first latch member on a side member, for pivotal movement of said first latch member about a vertical axis between a locking position, in which said latch member extends outwardly from said side member in said path of movement of said link, and a retracted position in which said first latch member does not extend into said path;
    means normally urging said first latch member toward its locking position;
    means on said first latch member engageable by said link when the link moves from its first to its second position, for pivoting said first latch member from its locking to its retracted positon;
    and means for preventing movement of the first latch member from its locking position upon being engaged by said link member when the link member is urged from its second to its first position.

2. A walk-over seat as recited in claim 1 and comprising:
    manually operated means for moving said first latch member to its retracted position and for holding it there.

3. A walk-over seat as recited in claim 2 wherein said means for moving the first latch member comprises:
    a wiper member having lower and upper ends;
    means mounting said lower end for pivotal movement of the wiper member, about a horizontal axis disposed transversely to said side members, along a path extending between a first position in which the wiper member extends angularly upwardly from said axis and a second position in which the wiper member extends angularly upwardly and rearwardly in relation to its first position;
    means on said wiper member for engaging said first latch member when the latter is in its locking position and for urging the first latch member to its retracted position in response to pivotal movement of the wiper member from its first to its second position;
    and means on said wiper member for holding said first latch member in its retracted position when the wiper member is in its second position.

4. A walk-over seat as recited in claim 3 wherein said mounting means for the wiper member comprises:

means mounting said lower end of the wiper member on said rod and for pivotal movement about the axis of said rod independent of the pivotal movement of said link about the axis of said rod.

5. A walk-over seat as recited in claim 1 and comprising:
   a second link having an upper end connected to said seat back and a lower end;
   a second horizontal rod extending between said side members;
   means mounting said lower end of said second link on said second rod for pivotal movement of the second link about the axis of the second rod and along a path extending between a first position, in which the link extends angularly upwardly from the second rod towards the front end of the seat, and a second position in which the second link extends angularly upwardly towards the rear end of the seat;
   a second latch member;
   means mounting said second latch member on the said side member as said first latch member, for pivotal movement of said second latch member about a vertical axis between a locking position, in which said second latch member extends outwardly from said side member in said path of movement of said second link, and a retracted position in which said second latch member does not extend into said path;
   means normally urging said second latch member toward its locking position;
   means on said second latch member engageable by said second link when the second link moves from its second to its first position, for pivoting said second latch member from its locking to its retracted position;
   and means for preventing movement of the second latch member from its locking position upon being engaged by said second link when the latter is urged from its first to its second position.

6. A walk-over seat as recited in claim 5 and comprising:
   manually operated means for moving one of said two latch members to its retracted position and holding it there while permitting the other of said two latch members to occupy its locking position.

7. A walk-over seat as recited in claim 6 wherein said means for moving the latch members comprises:
   means for operating alternately on each of the two latch members.

8. A walk-over seat as recited in claim 7 wherein said means for moving the latch members comprises:
   a wiper member having lower and upper ends;
   means mounting said lower end for pivotal movement of the wiper member, about a horizontal axis disposed transversely to said side members, along a path extending between a first position in which the wiper member extends upwardly from said axis and a second position in which the wiper member extends angularly upwardly and rearwardly relative to its first position;
   means on said wiper member for engaging said first latch member when the latter is in its locking position and for urging the first latch member to its retracted position in response to pivotal movement of the wiper member from its first to its second position;
   means on said wiper member for holding said first latch member in its retracted position when the wiper member is in its second position;
   means on said wiper member for engaging said second latch member when the latter is in its locking position and for urging the second latch member to its retracted position in response to pivotal movement of the wiper member from its second to its first position;
   and means on said wiper member for holding said second latch member in its retracted position when the wiper member is in its first position.

9. A walk-over seat as recited in claim 5 wherein said means for urging both of said latch members toward their respective locking positions comprises:
   a coil spring having one end connected to the first latch member and another end connected to the second latch member.

10. A walk-over seat as recited in claim 1 wherein said means for preventing movement of the first latch member from its locking position comprises:
    a stop element mounted on said side member;
    and means on said first latch member and on said stop element cooperating to transfer to said side member the load exerted against said first latch member upon being engaged by the link when the latter is urged from its second to its first position.

11. A walk-over seat as recited in claim 10 wherein said means for preventing movement of the first latch member from its locking position comprises:
    means for preventing said first latch member from being sprung out of locking engagement with said link in response to the transfer of said load.

12. A walk-over seat as recited in claim 1 wherein:
    said link comprises a pair of side surfaces and front and rear surfaces;
    said first latch member comprises means for engaging the front surface of said link when the latter is urged from its second towards its first position and the first latch member is in its locking position;
    one of said side surfaces of the link being adjacent the side member on which said latch member is mounted;
    and means on said first latch member for abutting against said one side surface of the link when the first latch member is in its locking position and the link is in its second position.

13. A walk-over seat as recited in claim 12 wherein said first latch member comprises:
    a pawl portion and a tail portion connected to the rear of said tail portion;
    said pawl portion comprising a pair of side surfaces, top and bottom surfaces and an end surface;
    said pawl portion being cut away at said bottom surface, said end surface and one side surface to provide a cut-away portion for receiving said link when the latter is in its second position and the first latch member is in its locking position;
    said cut-away portion having an upper ceiling and an inner wall;
    said means for engaging the front surface of said link being located on said upper ceiling of the cut-away portion;
    and said means for abutting against said one side surface of the link being located on said inner wall of the cut-away portion.

14. A walk-over seat as recited in claim 13 wherein:

said cut-away portion has an open front at said end surface of the pawl portion, an open bottom at the bottom surface of the pawl portion, and a side opening at said one side surface of the pawl portion;

said inner wall of the cut-away portion extends angularly outwardly and rearwardly from said end surface to said one side surface of the pawl portion;

said upper ceiling of the cut-away portion extends outwardly from said inner side wall to said side opening;

and said upper ceiling extends downwardly and rearwardly from said open front.

15. A walk-over seat as recited in claim 1 and comprising:

another of said links;

each of said links being located adjacent a respective side member and being pivotally mounted on said rod;

another of said first latch members;

each of said first latch members being pivotally mounted on a respective side member for engagement with a respective link.

16. A latch member for engaging a seat back link on a walk-over seat, said latch member comprising:

a pawl portion and a tail portion connected to the rear of said pawl portion;

said pawl portion comprising a pair of side surfaces, top and bottom surfaces and an end surface;

said pawl portion being cut away at said bottom surface, said end surface and one side surface to provide a cut-away portion for receiving a link;

said cut-away portion having an upper ceiling and an inner wall;

an open front at said end surface, an open bottom at said bottom surface and a side opening at one side surface of the pawl portion;

said inner wall of the cut-away portion extending angularly outwardly and rearwardly from said end surface to said one side surface of the pawl portion;

said inner wall of the cut-away portion extending angularly outwardly and rearwardly from said end surface to said one side surface of the pawl portion;

said upper ceiling of the cut-away portion extending outwardly from said inner side wall to said side opening;

and said upper ceiling extending downwardly and rearwardly from said open front.

* * * * *

UNITED STATES PATENT AND TRADEMARK OFFICE
CERTIFICATE OF CORRECTION

PATENT NO. : 4,407,542
DATED : October 4, 1983
INVENTOR(S) : Norman J. Kehl and Richard D. Unser It is certified that error appears in the above-identified patent and that said Letters Patent are hereby corrected as shown below:

Col. 2, lines 24-25, "member" should be --movement--;

Col. 7, line 58, after "upwardly" insert --away--;

Col. 9, line 22, "said side member" should be --same side member--.

Signed and Sealed this

Tenth Day of January 1984

[SEAL]

Attest:

GERALD J. MOSSINGHOFF

*Attesting Officer*  *Commissioner of Patents and Trademarks*